M. T. WILLEY.
VALVE STEM ATTACHMENT.
APPLICATION FILED MAY 6, 1920.
1,388,137.
Patented Aug. 16, 1921.
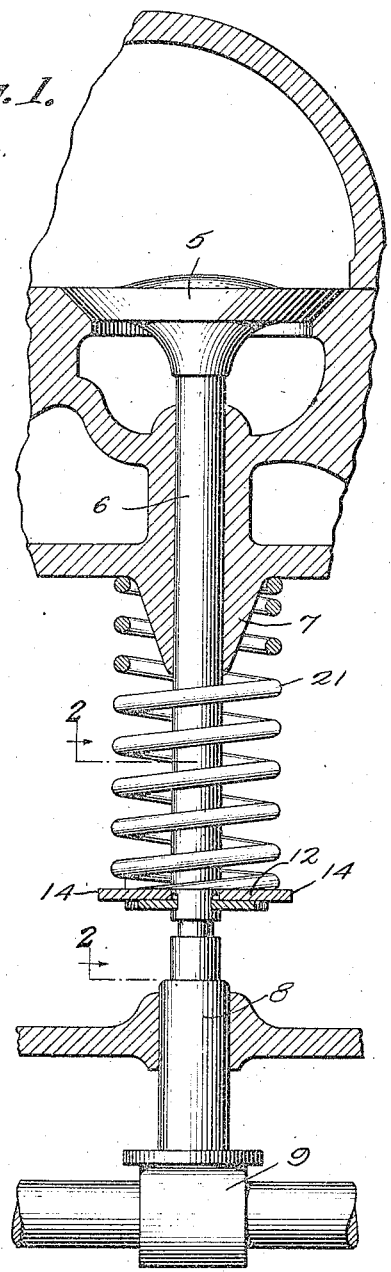
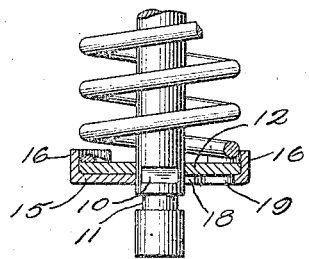
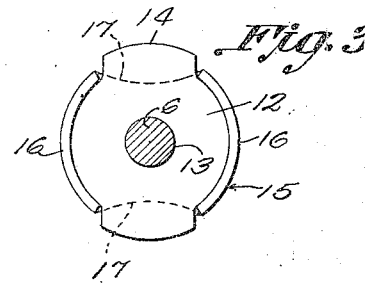
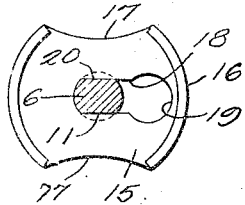
INVENTOR.
Martin T. Willey
BY
ATTORNEY.

UNITED STATES PATENT OFFICE.

MARTIN T. WILLEY, OF LEAD, SOUTH DAKOTA.

VALVE-STEM ATTACHMENT.

1,388,137.                    Specification of Letters Patent.    Patented Aug. 16, 1921.

Application filed May 6, 1920. Serial No. 379,287.

*To all whom it may concern:*

Be it known that I, MARTIN T. WILLEY, a citizen of the United States, residing at Lead, in the county of Lawrence and State of South Dakota, have invented certain new and useful Improvements in Valve-Stem Attachments, of which the following is a specification.

My invention relates to a device for connecting the stem of a valve, such as are employed upon internal combustion engines, with the spring to seat the valve.

An important object of the invention is to provide a device of the above mentioned character, which is securely locked upon the valve stem, against accidental displacement, and may be quickly and conveniently operated to be separated from the valve stem.

A further object of the invention is to provide a device of the above mentioned character, which is simple in construction, inexpensive to manufacture, strong and durable.

Other objects and advantages of the invention will be apparent during the course of the following description.

In the accompanying drawings forming a part of this specification, and in which like numerals are employed to designate like parts throughout the same, Figure 1 is a side elevation of a valve stem and associated elements, showing my improved device in section applied thereto.

Fig. 2 is a sectional view through the device at a right angle to Fig. 1, taken on line 2—2 of Fig. 1, Fig. 3 is a plan view of the device, the valve stem being in section, and, Fig. 4 is a similar view of the locking element or cap.

In the drawings, wherein for the purpose of illustration is shown a preferred embodiment of my invention, the numeral 5 designates a valve, of an internal combustion engine or the like, having a reciprocatory stem 6, operating through a sleeve 7. The lower end of this stem may contact with a cam plunger of the rod 8, operated by a cam 9.

The stem 6 is provided near its lower or free end with diametrically oppositely arranged openings or notches 10, and an annular groove 11, as shown.

The numeral 12 designates an inner element or washer, having a central circular opening 13, slidably receiving the stem 6. This element or washer is provided with diametrically arranged extensions 14, of substantial length, projecting radially beyond the periphery of the washer.

The numeral 15 designates an outer locking element or cap, having diametrically arranged flanges 16, which are segmental, and extend laterally and inwardly. These flanges receive the element or washer 12 therein, and the ends of the segmental flanges are spaced, forming an opening therebetween for the reception of the extensions 14. The locking element or cap 15 has its material at 17, cut away, forming segmental recesses, thereby increasing the exposed area of the extensions 14, and allowing of a more convenient engagement of such extensions by the fingers or a tool, for slightly compressing the spring, to be described. The locking element or cap 15 has a key-hole opening 18 formed therein, embodying an outer large circular portion 19, for the passage of the stem 6, and an inner radial straight contracted portion 20, the side walls of which are adapted for insertion within the recesses or notches 10 and groove 11, to interlock with the edges thereof.

The numeral 21 designates a compressible coil spring, one end of which receives the sleeve 7 while its opposite end engages the element or washer 12, as clearly shown in Fig. 1.

The operation of the device is as follows:

With the parts arranged as shown in Fig. 1, when it is desired to release the stem 6 from the action of the spring, the extensions 14 are engaged by the fingers of the operator, or by a suitable tool, and the inner element or washer 12 moved upwardly to slightly compress the coil spring. When the element 12 is moved upwardly sufficiently so that it clears the segmental flanges 16, the locking element or cap 15 may then be shifted laterally with respect to the element or washer 12, thereby bringing the outer large portion 19 of the key-hole opening in alinement with the stem 6, whereby the locking element is free to slide toward or from the free end of the stem, and the stem released from locking engagement with the element 15.

The opposite of this operation occurs when the device is being applied to the stem.

An important advantage of the device is that the parts thereof are locked together and locked to the stem in a manner to make accidental displacement impossible, but at the same time allowing of the quick and convenient separation of these elements, by exerting pressure upon opposite sides of the inner element or washer.

It is to be understood that the form of my invention herewith shown and described is to be taken as a preferred example of the same, and that various changes in the shape, size, and arrangement of parts may be resorted to without departing from the spirit of my invention, or the scope of the subjoined claims.

Having thus described my invention, I claim:

1. The combination with a valve and its stem, said stem having recess means near its free end, of a spring surrounding the stem, a washer having an opening to receive the stem and oppositely arranged extensions projecting radially beyond its periphery for substantial distances, said washer engaging the spring, and a cap arranged upon the outer side of the washer, said cap having oppositely arranged segmental inwardly and laterally extending flanges to receive therein the washer, the flanges being spaced to form openings for the passage of said extensions, said cap being provided with a key-hole opening having its large portion disposed outwardly, said key-hole opening extending transversely of the flanges with its inner reduced portion adapted to engage within said recess means.

2. The combination with a valve and its stem, said stem having recess means near its free end, of a spring surrounding the stem, a washer having an opening to receive the stem and oppositely arranged extensions projecting radially beyond its periphery for substantial distances, said washer engaging the spring, and a cap arranged upon the outer side of the washer, said cap having oppositely arranged segmental inwardly and laterally extending flanges to receive therein the washer, the flanges being spaced to form openings for the passage of the extensions, said cap having its material adjacent the openings cut away for providing recesses for increasing the exposed area of said extensions, said cap being provided with a key-hole opening having its large portion disposed outwardly, said key-hole opening extending radially and transversely of the flanges, the inner reduced portion of the key-hole opening being adapted to engage within the recess means.

3. The combination with a valve and its stem, said stem being provided near its free end with recess means, of a spring surrounding the stem, a washer having an opening to receive the stem and provided with oppositely arranged radially projecting extensions, and a cap arranged outwardly of the washer, said cap having a radially extending key-hole opening with its larger portion disposed outermost, the inner smaller portion of the key-hole opening engaging with the recess means, said cap being provided near the large end of the key-hole opening with a laterally extending flange to engage with the edge of the washer between said extensions, said flange extending transversely of the key-hole opening, the extensions projecting outwardly beyond the cap.

4. An attachment for a valve stem having recess means, comprising a washer having an opening to receive the valve stem and oppositely arranged radially projecting extensions, and a cap to receive the washer therein, said cap having a pair of spaced laterally extending flanges, the spaces between said flanges receiving said extensions, and a key-hole opening extending transversely of the flanges, the inner smaller portion of the key-hole opening engaging with the recess means.

5. An attachment for a valve stem having engaging means comprising a washer having an opening to receive the stem, and a cap to receive the washer therein, said cap having a pair of spaced laterally projecting flanges and a key-hole opening transversely of the flanges, the smaller portion of the key-hole opening engaging with the engaging means.

6. An attachment for a valve stem having engaging means, comprising an inner element having an opening to receive the valve stem, and an outer element engaging the inner element, the outer element having laterally extending members which are spaced to form openings for receiving the ends of the inner element, said outer element also having a key-hole opening extending transversely of the laterally extending members, said key-hole opening having its smaller portion engaging with the engaging means.

In testimony whereof I affix my signature in presence of two witnesses.

MARTIN T. WILLEY.

Witnesses:
MARTIN JELBERT, Jr.,
PERCY G. FIELDER.